United States Patent
Kim

(10) Patent No.: US 11,394,267 B2
(45) Date of Patent: Jul. 19, 2022

(54) MOTOR

(71) Applicant: LG INNOTEK CO., LTD., Seoul (KR)

(72) Inventor: Jung Keun Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 180 days.

(21) Appl. No.: 16/966,267

(22) PCT Filed: Feb. 1, 2019

(86) PCT No.: PCT/KR2019/001413
§ 371 (c)(1),
(2) Date: Jul. 30, 2020

(87) PCT Pub. No.: WO2019/156440
PCT Pub. Date: Aug. 15, 2019

(65) Prior Publication Data
US 2020/0395809 A1  Dec. 17, 2020

(30) Foreign Application Priority Data

Feb. 7, 2018 (KR) .................. 10-2018-0015127

(51) Int. Cl.
*H02K 3/52* (2006.01)
*B62D 5/04* (2006.01)

(52) U.S. Cl.
CPC ........... *H02K 3/522* (2013.01); *B62D 5/0403* (2013.01); *H02K 2203/09* (2013.01)

(58) Field of Classification Search
CPC ...................... H02K 2203/09; H02K 3/522
See application file for complete search history.

(56) References Cited

U.S. PATENT DOCUMENTS 8,816,550 B2 *   8/2014   Kim ............... B62D 5/0403
                                                  310/43
10,547,228 B2 * 1/2020   Kong ..................... H02K 3/28
(Continued)

FOREIGN PATENT DOCUMENTS

JP   2008-022626   1/2008
JP   2014-161155   9/2014
(Continued)

OTHER PUBLICATIONS

International Search Report dated May 10, 2019 issued in Application No. PCT/KR2019/001413.

*Primary Examiner* — Robert W Horn
(74) *Attorney, Agent, or Firm* — KED & Associates, LLP

(57) ABSTRACT

The present invention may provide a motor including a housing, a stator disposed in the housing, a rotor disposed in the stator, a shaft coupled to the rotor, and a bus bar disposed on the stator and including a plurality of terminals, wherein the plurality of terminals include a neutral terminal and a plurality of phase terminals, the neutral terminal includes a first body of which a first width in a radial direction is greater than a second width in an axial direction and a plurality of first connectors extending from the first body, and the phase terminal includes a second body of which a first width in the radial direction is less than a second width in the axial direction and a plurality of second connectors extending from the second body.

11 Claims, 12 Drawing Sheets

(56) References Cited

U.S. PATENT DOCUMENTS

| | | | | |
|---|---|---|---|---|
| 2016/0190887 A1* | 6/2016 | Sambuichi | ............... | H02K 3/38 |
| | | | | 310/71 |
| 2018/0316238 A1 | 11/2018 | Kong | | |
| 2019/0348884 A1* | 11/2019 | Popa | ....................... | H02K 3/522 |
| 2020/0381974 A1* | 12/2020 | Lee | ........................ | H02K 3/522 |
| 2020/0395809 A1* | 12/2020 | Kim | ....................... | H02K 3/522 |
| 2021/0057955 A1* | 2/2021 | Ryu | ....................... | H02K 1/146 |
| 2022/0069659 A1* | 3/2022 | Lee | ........................ | H02K 5/225 |

FOREIGN PATENT DOCUMENTS

| | | |
|---|---|---|
| KR | 20-2011-0008582 | 9/2011 |
| KR | 10-2017-0052980 | 5/2017 |
| KR | 10-2017-0128718 | 11/2017 |

* cited by examiner

[FIG. 1]
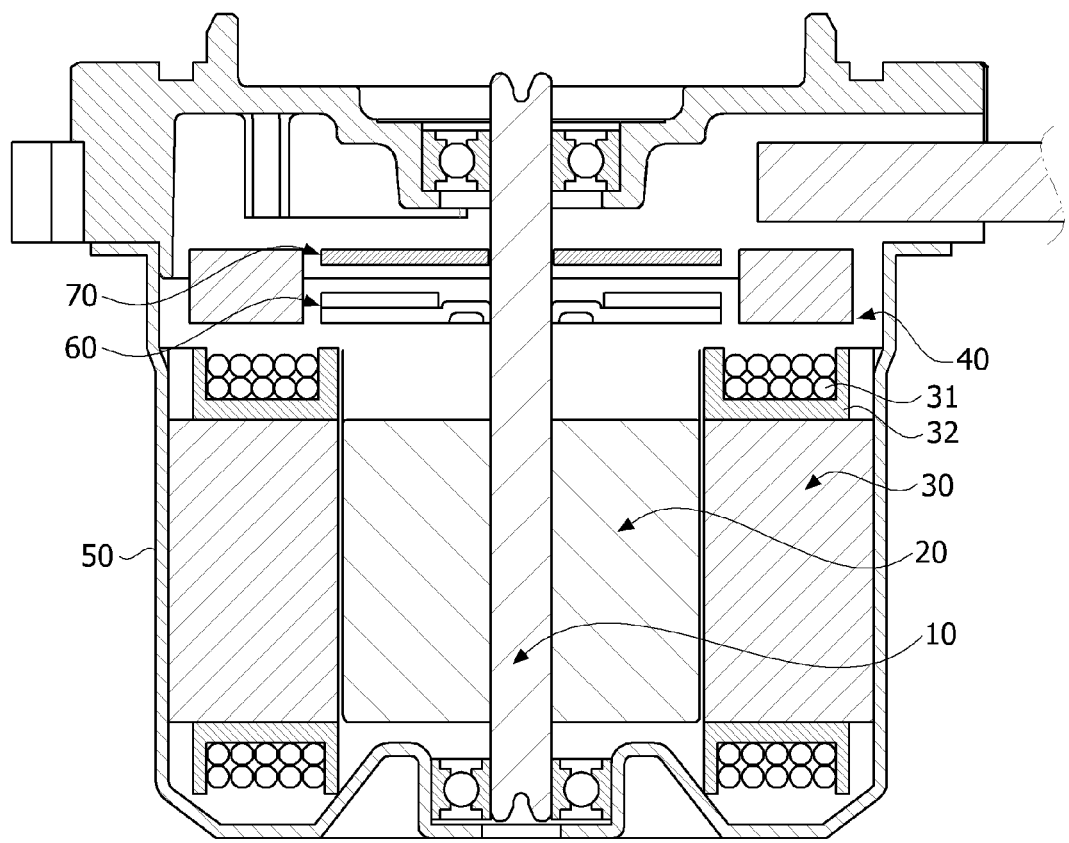

[FIG. 2]
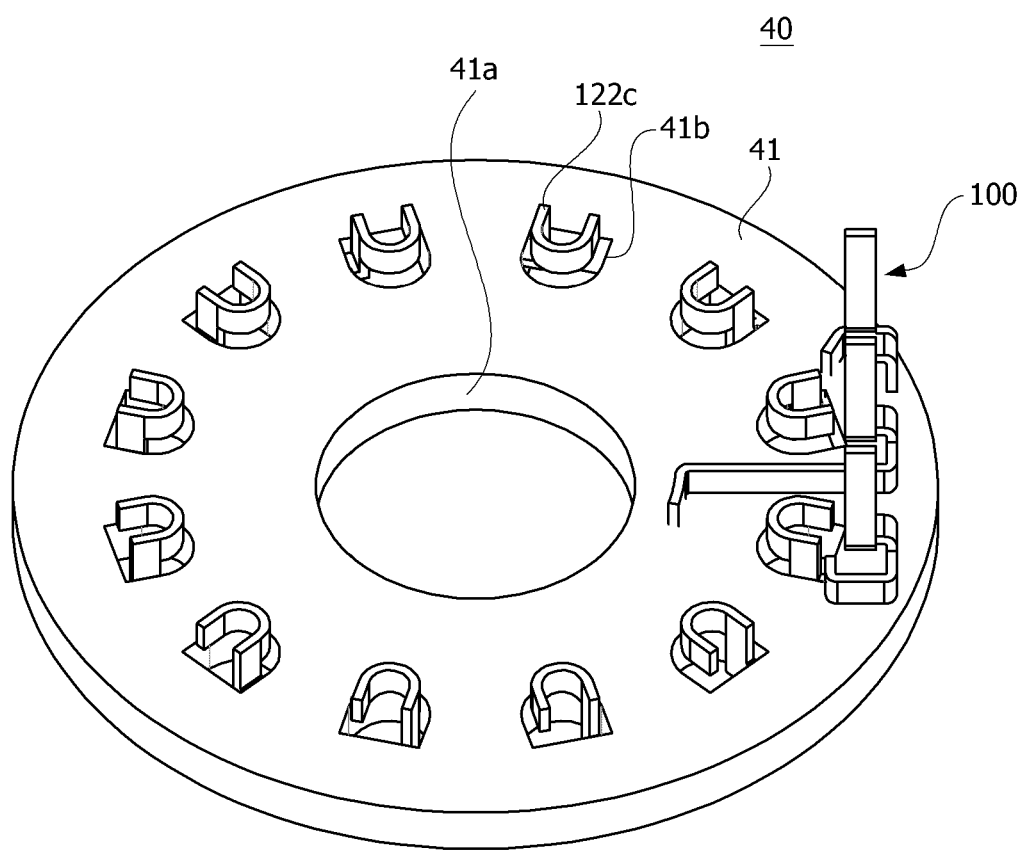

[FIG. 3]
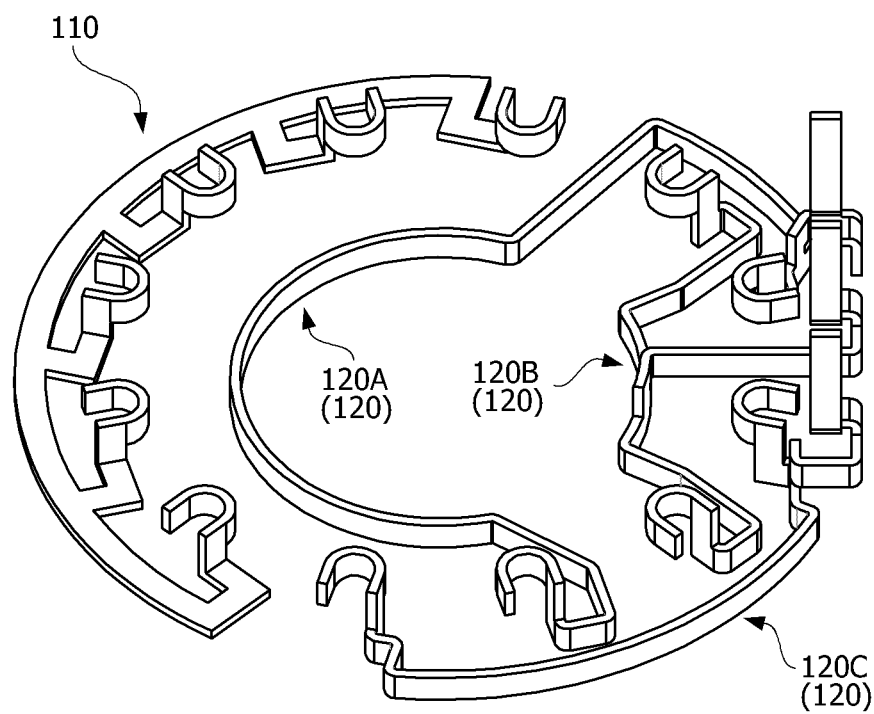

[FIG. 4]
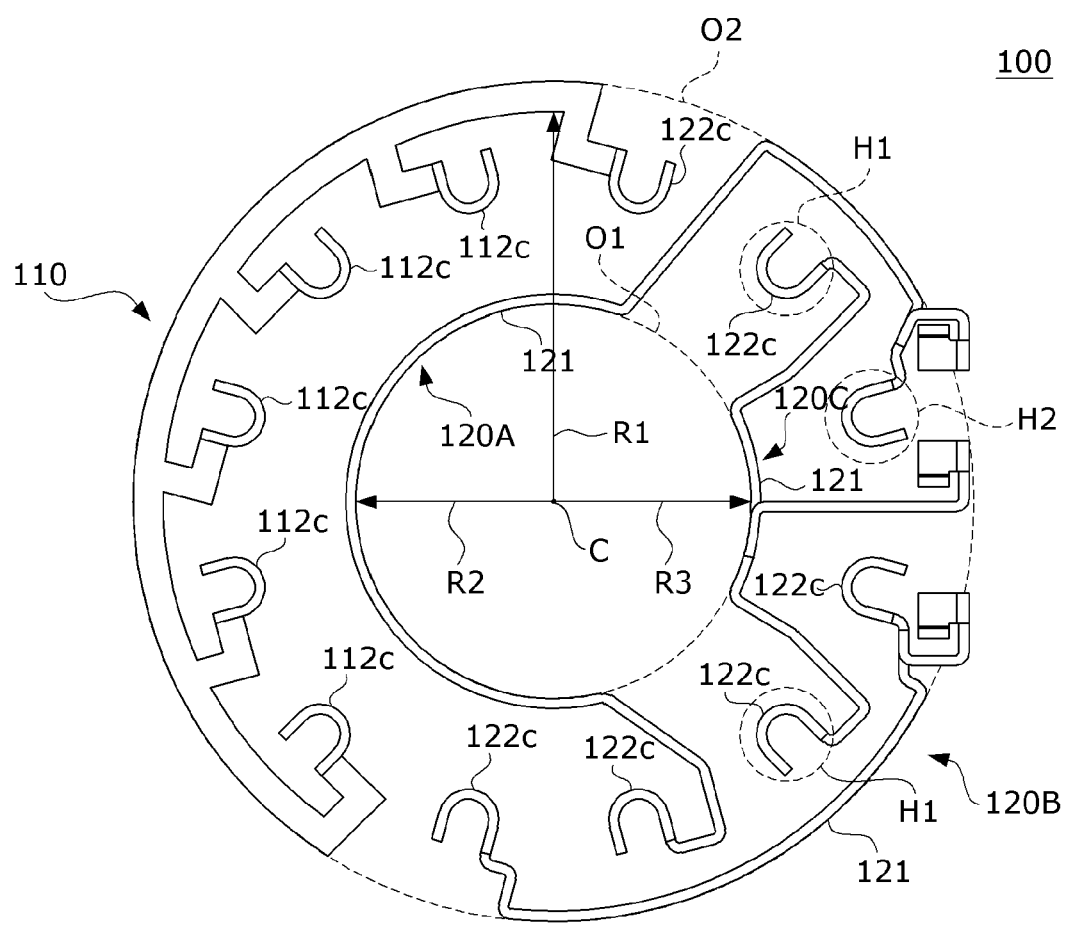

[FIG. 5]
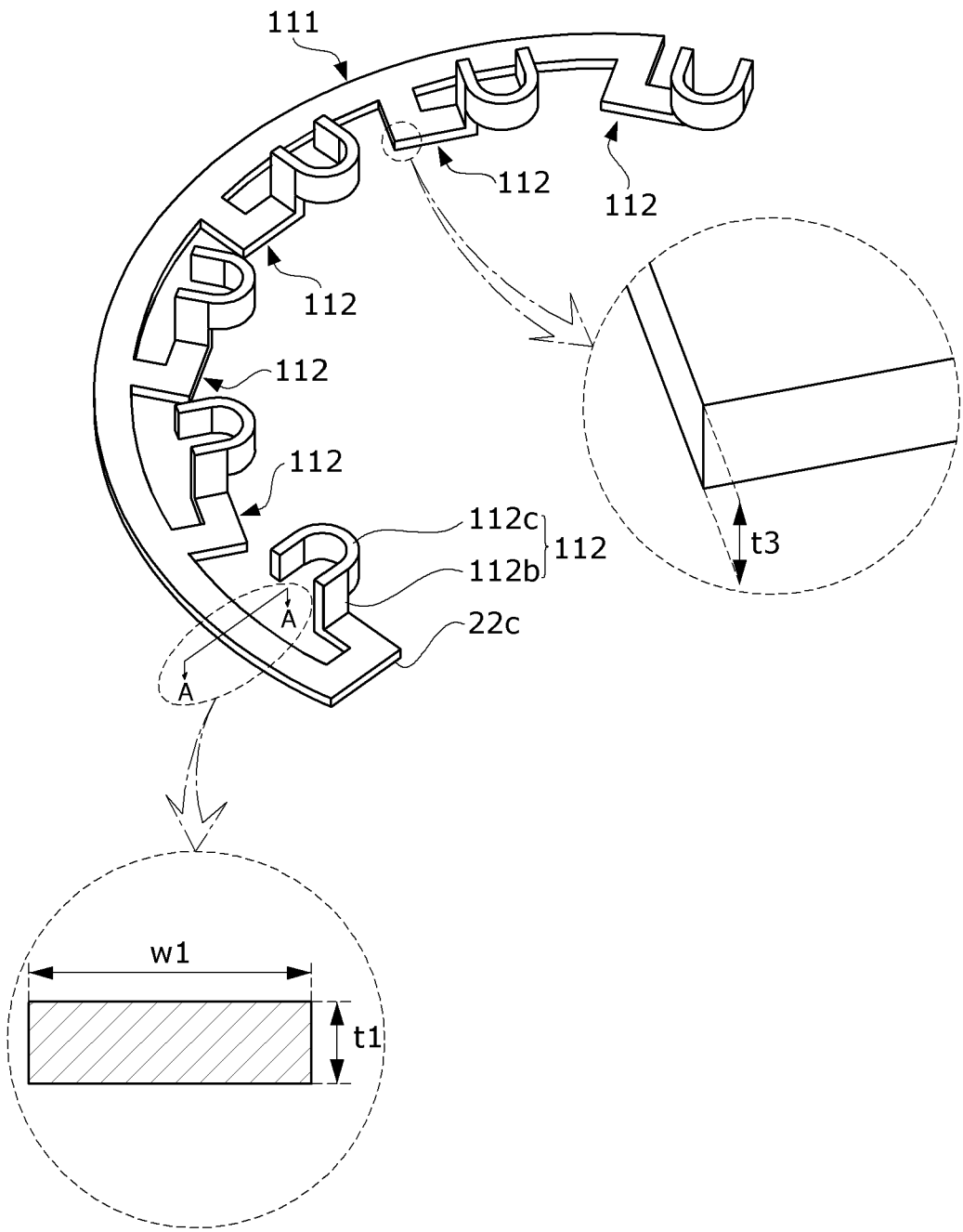

[FIG. 6]
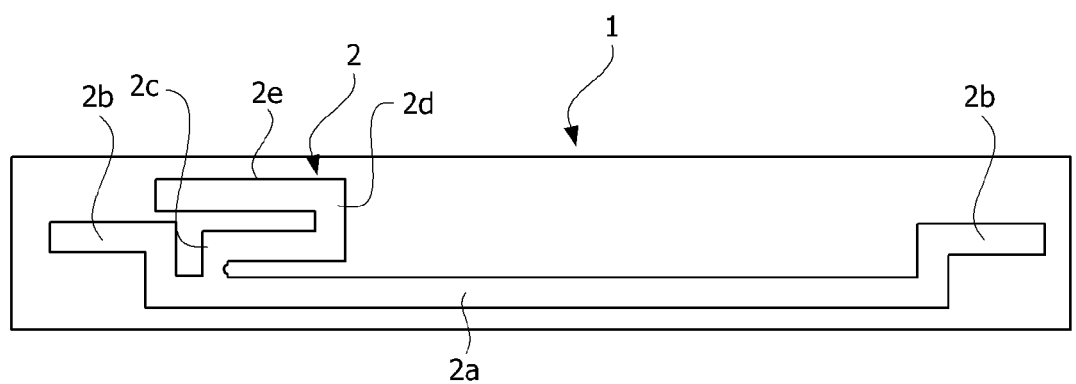

[FIG. 7]
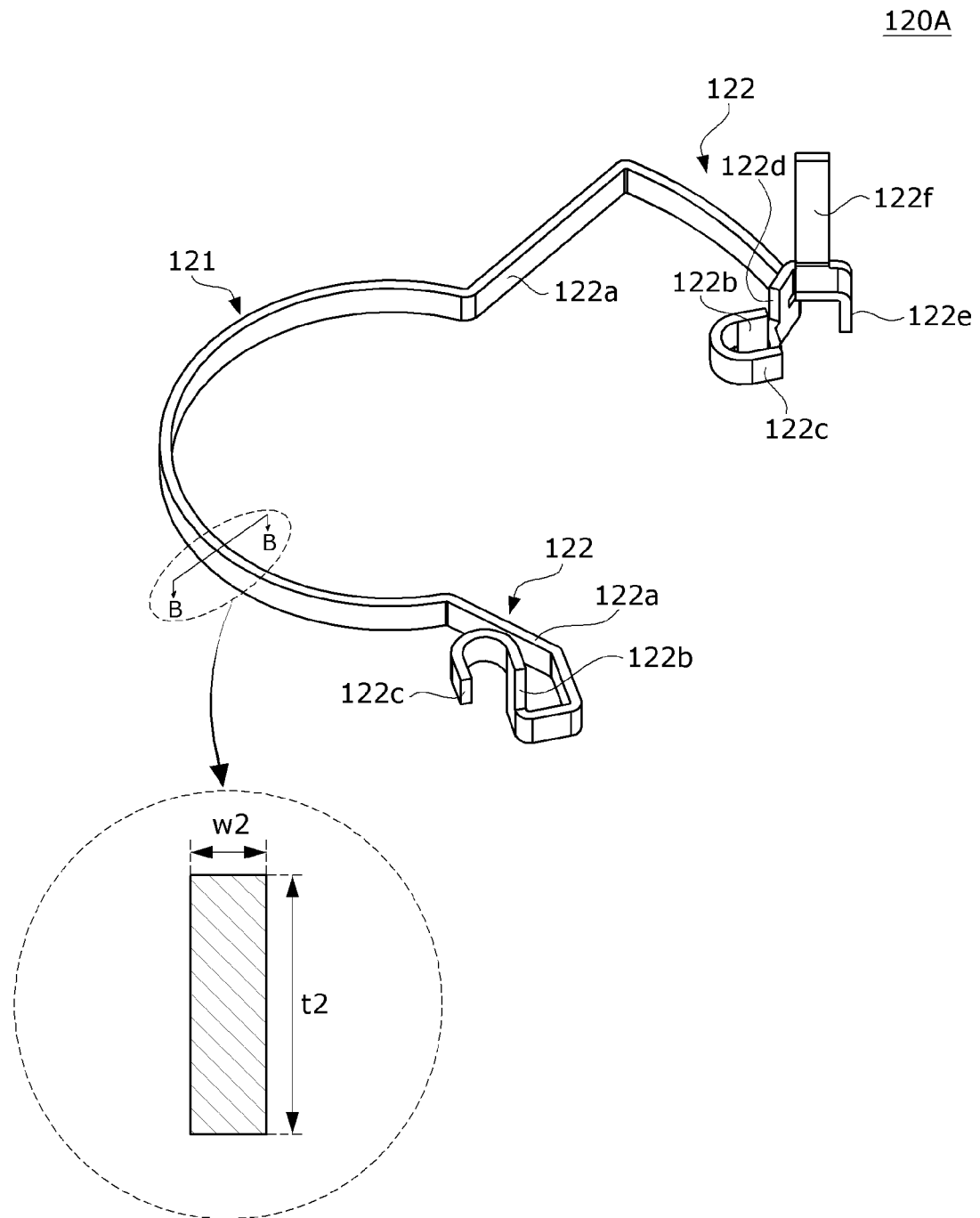

[FIG. 8]
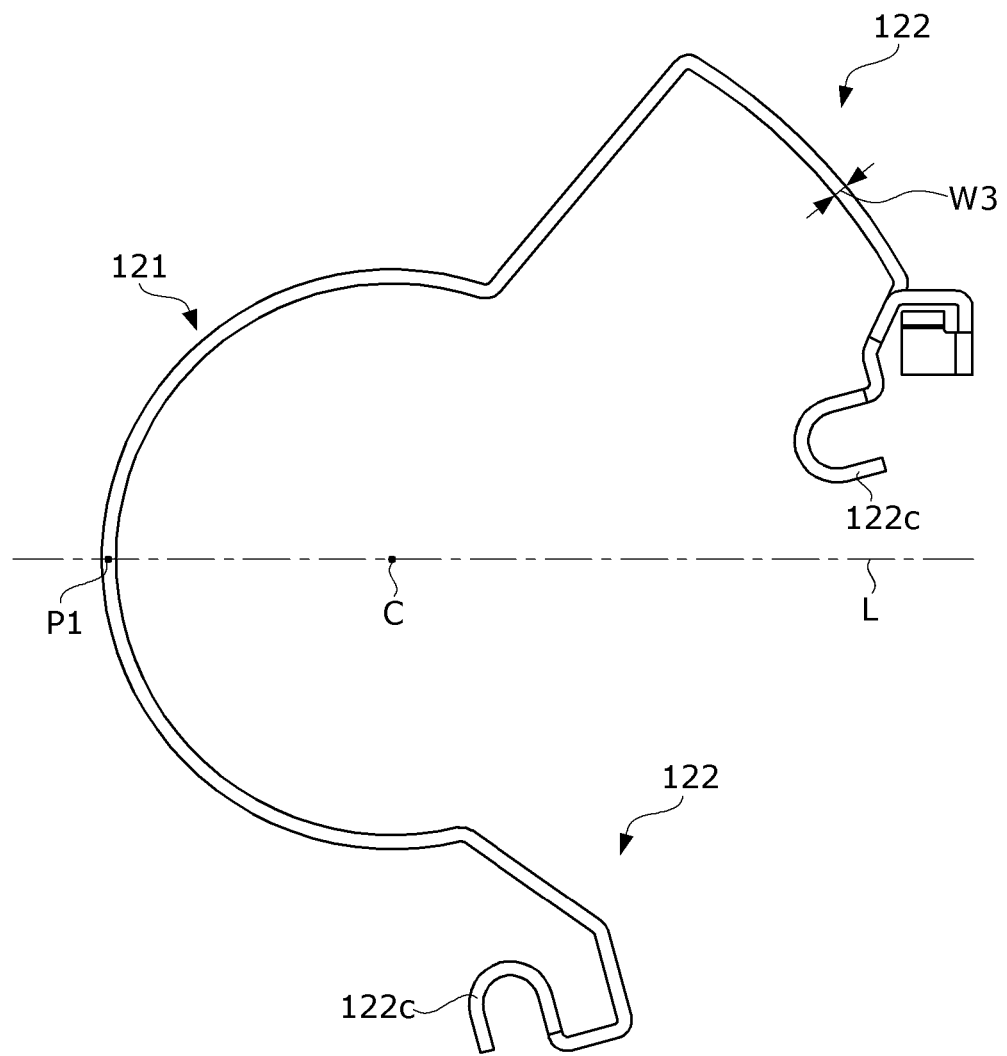

[FIG. 9]
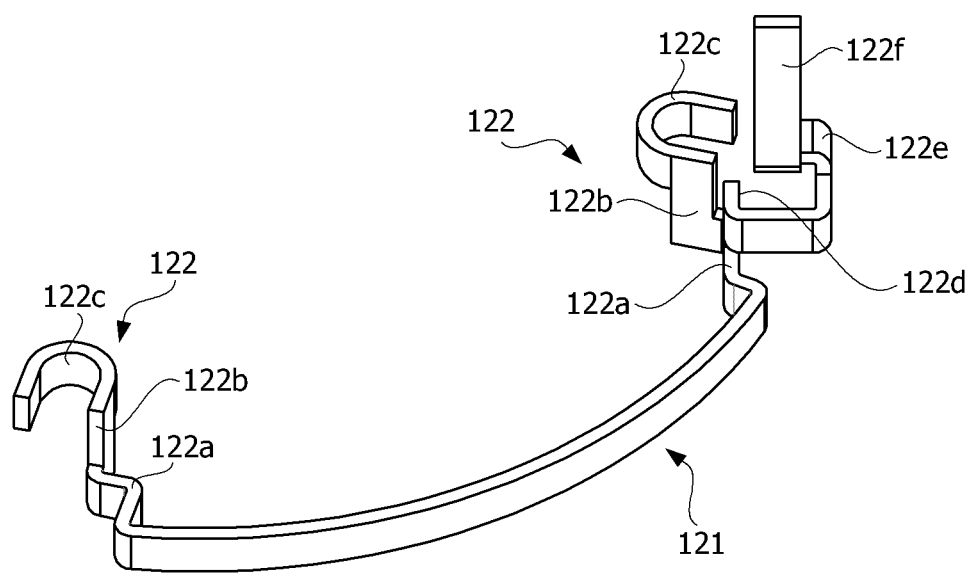

[FIG. 10]
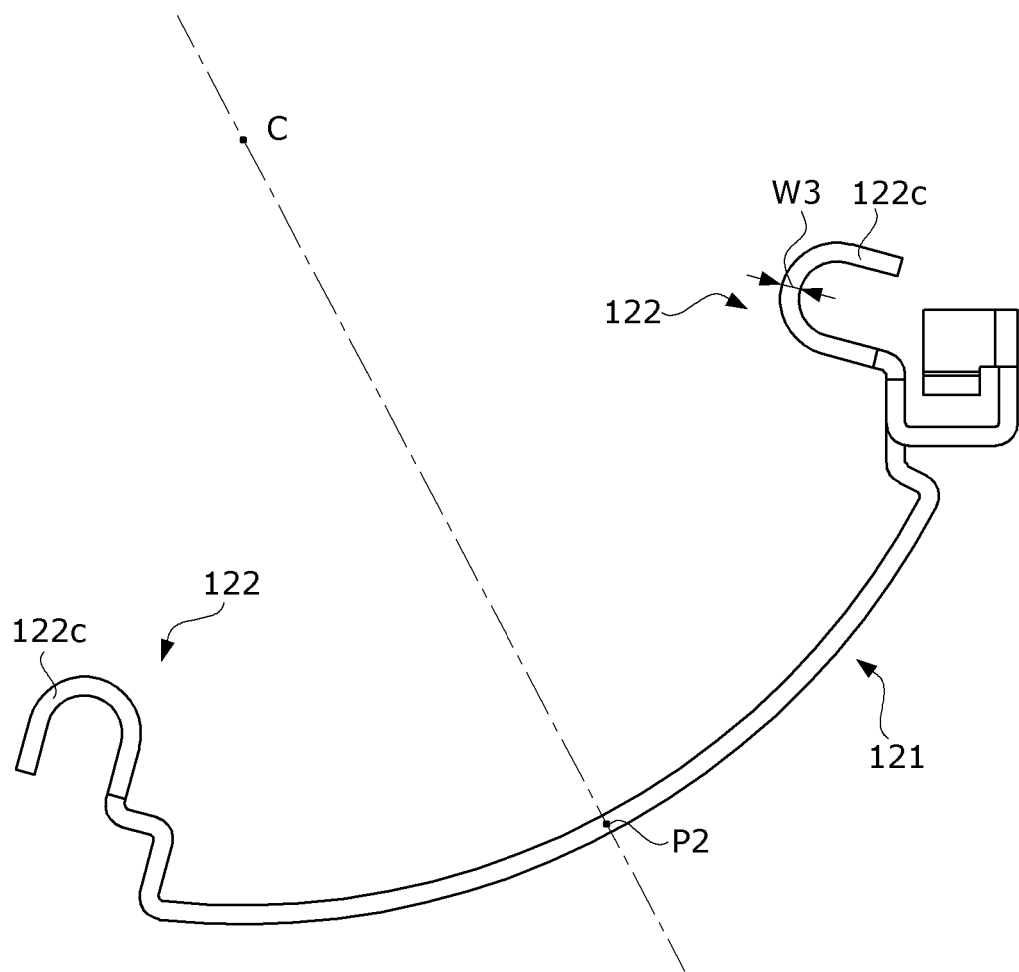

[FIG. 11]
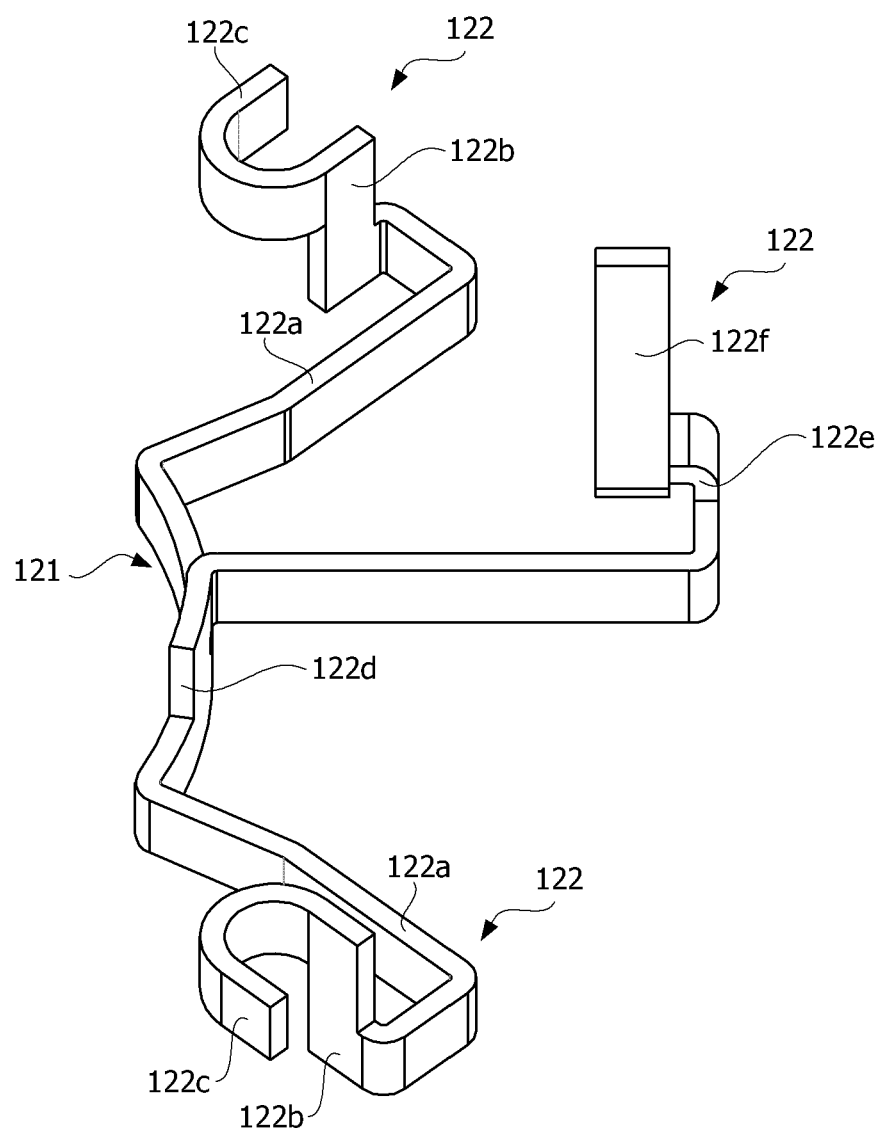

[FIG. 12]
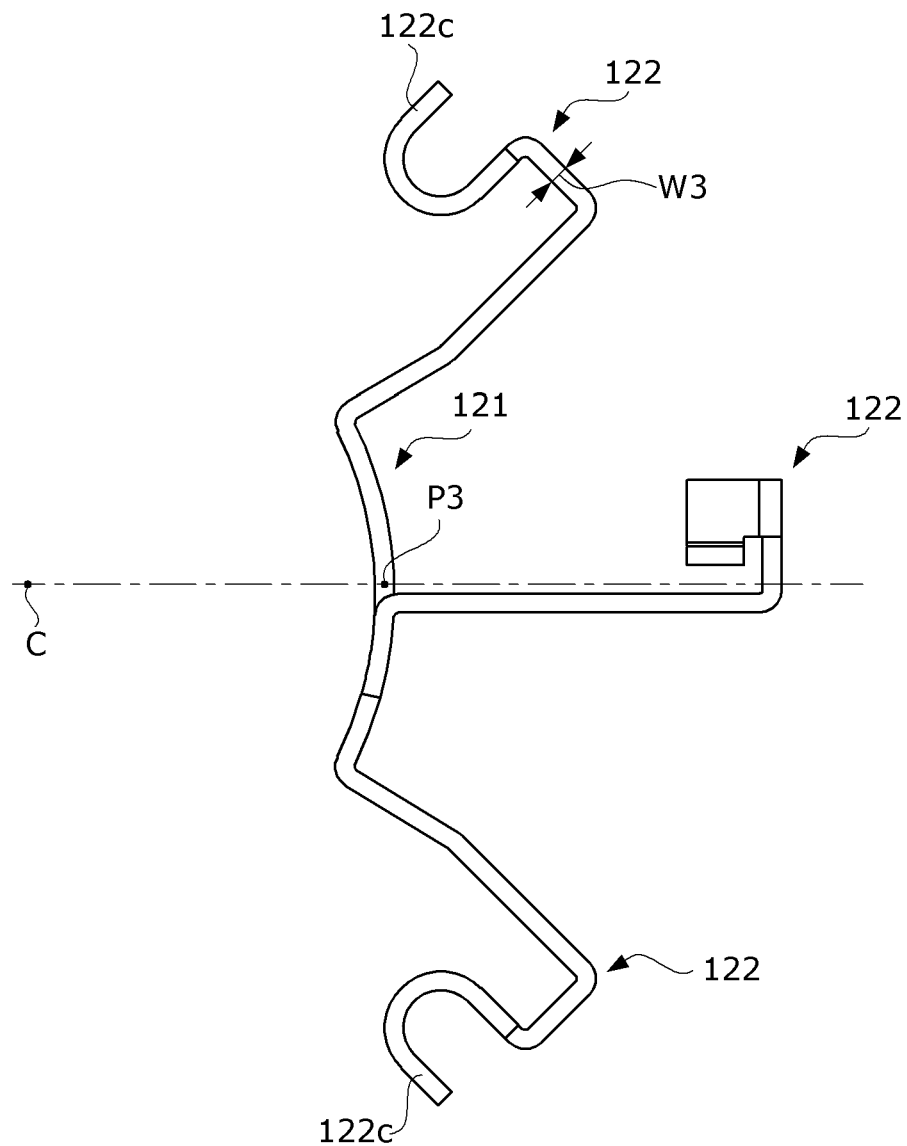

MOTOR

CROSS-REFERENCE TO RELATED PATENT APPLICATIONS

This application is a U.S. National Stage Application under 35 U.S.C. § 371 of PCT Application No. PCT/KR2019/001413, filed Feb. 1, 2019, which claims priority to Korean Patent Application No. 10-2018-0015127, filed Feb. 7, 2018, whose entire disclosures are hereby incorporated by reference.

TECHNICAL FIELD

The present invention relates to a motor.

BACKGROUND ART

Electronic power steering (EPS) systems secure turning stability of vehicles and provide quick reinforcing force so that drivers can stably drive. Such an EPS system uses an electronic control unit (ECU) to drive a motor according to driving conditions detected by a speed sensor, a torque angle sensor, a torque sensor, and the like so as to control operation of a steering shaft of a vehicle.

A motor includes a rotor and a stator. A coil is wound around the stator. A connection terminal of the coil wound around the stator may be connected to a bus bar. The bus bar includes a body and a terminal. The terminal is connected to the coil. The terminal includes a body and a plurality of connectors extending from the body. The body of the terminal includes a substantially curved surface, and the connector has a shape branched off from the body. The terminal may be manufactured by punching a development pattern in a sheet metal material, but there is a problem of generating a great deal of scrap due to the shape of the terminal.

Technical Problem

The present invention is directed to providing a motor including a terminal which allows fewer scraps to be generated during a manufacturing process.

Objectives that should be solved according to embodiments are not limited to the above described objectives, and other objectives which are not described above will be clearly understood by those skilled in the art from the following specification.

Technical Solution

One aspect of the present invention provides a motor including a housing, a stator disposed in the housing, a rotor disposed in the stator, a shaft coupled to the rotor, and a bus bar disposed on the stator and including a plurality of terminals, wherein the plurality of terminals include a neutral terminal and a plurality of phase terminals, the neutral terminal includes a first body of which a first width in a radial direction is greater than a second width in an axial direction and a plurality of first connectors extending from the first body, and the phase terminal includes a second body of which a first width in the radial direction is less than a second width in the axial direction and a plurality of second connectors extending from the second body.

A first width of the neutral terminal may be equal to a second width of the phase terminal, and a second width of the neutral terminal may be equal to a first width of the phase terminal.

A width of the first connector of the neutral terminal in the axial direction may be equal to a width of the second connector of the phase terminal in the radial direction.

The first body or the second body is disposed on a first orbit and a second orbit around a center of the bus bar, the plurality of phase terminals may include a first phase terminal, a second phase terminal, and a third phase terminal, a second body of the first phase terminal and a second body of the third phase terminal may be disposed on the first orbit, and a second body of the second phase terminal may be disposed on the second orbit.

The first orbit may be disposed inward from the second orbit around the center of the bus bar.

The first body of the neutral terminal may be disposed on the second orbit.

The second connector may include a lateral portion extending from one side of the second body, a vertical portion extending upward from one portion of the lateral portion, and a terminal protruding from one portion of the vertical portion, and the terminal is connected to a coil of the stator.

The terminal of any one phase terminal among the first phase terminal, the second phase terminal, and the third phase terminal may be disposed between two terminals of another phase terminal in a circumferential direction.

Two terminals of the first phase terminal may be asymmetrically disposed with respect to a virtual line connecting a center of the first orbit and a center of the second body of the first phase terminal.

Two terminals of the second phase terminal may be symmetrically disposed with reference to a virtual line connecting the center of the first orbit and a center of the second body of the second phase terminal.

A length from a center of the bus bar to the first body of the neutral terminal in the radial direction is greater than a length from the center of the bus bar to the second body of the phase terminal in the radial direction.

Advantageous Effects

According to embodiments, since a terminal which allows fewer scraps to be generated during a manufacturing process is included, there is an advantageous effect of significantly reducing a manufacturing cost.

DESCRIPTION OF DRAWINGS

FIG. 1 is a side cross-sectional view illustrating a motor according to an embodiment.

FIG. 2 is a view illustrating a bus bar.

FIG. 3 is a perspective view illustrating a terminal of the bus bar illustrated in FIG. 2.

FIG. 4 is a plan view illustrating the terminal illustrated in FIG. 3.

FIG. 5 is a perspective view illustrating a neutral terminal.

FIG. 6 is a view illustrating a raw material of a phase terminal which has a development pattern of the phase terminal.

FIG. 7 is a view illustrating a first phase terminal.

FIG. 8 is a plan view illustrating the first phase terminal illustrated in FIG. 7.

FIG. 9 is a perspective view illustrating a second phase terminal.

FIG. 10 is a plan view illustrating the second phase terminal illustrated in FIG. 9.

FIG. 11 is a perspective view illustrating a third phase terminal.

FIG. 12 is a plan view illustrating the third phase terminal illustrated in FIG. 11.

MODES OF THE INVENTION

Hereinafter, exemplary embodiments of the present invention will be described with reference to the accompanying drawings in detail. Purposes, specific advantages, and novel features of the invention will be made clearer from the exemplary embodiments and the following detailed description in connection with the accompanying drawings. In addition, in the description of the invention, detailed descriptions of related well-known functions which unnecessarily obscure the gist of the invention will be omitted.

Although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

FIG. 1 is a side cross-sectional view illustrating a motor according to an embodiment.

Referring to FIG. 1, the motor according to the embodiment may include a shaft 10, a rotor 20, a stator 30, and a bus bar 40.

The shaft 10 may be coupled to the rotor 20. When a current is supplied, and an electrical interaction occurs between the rotor 20 and the stator 30, the rotor 20 is rotated, and the shaft 10 is rotated in conjunction with the rotor. The shaft 10 may be connected to a steering shaft of a vehicle and may transmit power to the steering shaft.

The rotor 20 is rotated due to the electrical interaction with the stator 30.

The rotor 20 may include a rotor core and a magnet. The rotor core may be formed to have a shape in which a plurality of circular steel plates are stacked or formed to have one cylindrical shape. A hole to which the shaft 10 is coupled may be disposed at a center of the rotor core. A protrusion for guiding the magnet may protrude from an outer circumferential surface of the rotor core. The magnet may be attached to the outer circumferential surface of the rotor core. A plurality of magnets may be disposed along a circumference of the rotor core at predetermined intervals. The rotor 20 may include a can member which fixedly surrounds the magnets so that the magnets are not separated from the rotor core and the magnets are prevented from being exposed.

Coils 31 may be wound around the stator 30 to induce an electrical interaction with the rotor 20. A specific structure of the stator 30 around which the coils 31 are wound will be described below. The stator 30 may include a stator core including a plurality of teeth. An annular yoke portion is provided and the teeth around which a coil is wound from a yoke toward a center thereof may be provided in the stator core. The teeth may be provided along an outer circumferential surface of the yoke portion at predetermined intervals. An insulator 32 is installed on the teeth. The coils are wound on the insulator 32. Meanwhile, the stator core may be provided as a plurality of thin steel plates which are stacked. In addition, the stator core may be provided as a plurality of divided cores which are coupled or connected to each other.

FIG. 2 is a view illustrating the bus bar.

Referring to FIGS. 1 and 2, the bus bar 40 may be disposed on the stator 30. The bus bar 40 may include terminals 100 on a body 41 having an annular shape. In addition, the terminals of the bus bar 40 may include phase terminals 120 (see FIG. 3) connected to U-phase, V-phase, and W-phase power sources and a neutral terminal 110 (see FIG. 3) electrically connecting the phase terminals.

A housing 50 may accommodate the rotor 20 and the stator 30 therein.

A sensing magnet 60 is coupled to the shaft 10 to operate in conjunction with the rotor 20. The sensing magnet 60 is an apparatus for detecting a position of the rotor 20.

A sensor for detecting a magnetic force of the sensing magnet 60 may be disposed on a printed circuit board 70. In this case, the sensor may be a Hall integrated circuit (IC). The sensor detects a change in N-pole and S-pole of the sensing magnet 60 and generates a sensing signal.

FIG. 3 is a perspective view illustrating the terminal of the bus bar illustrated in FIG. 2, and FIG. 4 is a plan view illustrating the terminal illustrated in FIG. 3.

Referring to FIGS. 3 and 4, the bus bar 40 includes the body 41 and the terminals 100. The body 41 is a mold part formed through an injection molding process. The body 41 includes a hole 40a in a central portion thereof. The terminals 100 are disposed on the body 41, and parts of end portions of the terminals 100 are disposed to be exposed at the body 41. The body 41 may have a substantially annular shape. The body 41 may include a plurality of through holes 41b. The plurality of through holes 41b may be disposed to be spaced a predetermined interval in a circumferential direction of the body 41. Connection terminals of the coils 31 pass through the through holes 41b from under the through holes 41b. Positions of the through holes 41b correspond to a position of a terminal 112c of the neutral terminal 110 and positions of terminals 122c of the phase terminals 120. The terminals 122c are disposed directly above the through holes. The terminals 122c are terminals fused and electrically connected to the connection terminals of the coils 31 passing through the through holes 41b.

The terminals 100 include the neutral terminal 110 and the phase terminals 120. For example, the terminals 100 may include one neutral terminal 110 and three phase terminals 120. Three phase terminals 120 are connected to the coils 31, and connected to external U-phase, V-phase, and W-phase power sources.

FIG. 5 is a perspective view illustrating the neutral terminal.

Referring to FIGS. 4 and 5, the neutral terminal 110 includes a first body 111 and a plurality of first connectors 112. The first body 111 has an arc shape. The plurality of first connectors 112 have shapes which extend from an inner circumferential surface of the first body 111. The first connector 112 includes a lateral portion 112a, a vertical portion 112b, and a terminal 112c. The lateral portion 112a is branched off from the inner circumferential surface of the first body 111. In addition, the vertical portion 112b is perpendicularly bent upward from the lateral portion 112a. The terminal 112c is bent from the vertical portion 112b. The terminal 112c is a portion connected to the coil 31. In the first body 111 of the neutral terminal 110, a second width t1 in an axial direction is less than a first width w1 in a radial direction on the basis of a cross-section taken along line A-A of FIG. 5. The terminal 100 includes the neutral terminal 110 having a shape formed to be laterally laid down. In the case of the neutral terminal 110, since the neutral terminal 110 includes many terminals 112c, the first body 111 should be directly manufactured from a sheet metal material without performing a machining process of bending the first body 111.

FIG. 6 is a view illustrating the raw material of the phase terminal which has a development pattern of the phase terminal, FIG. 7 is a view illustrating a first phase terminal, and FIG. 8 is a plan view illustrating the first phase terminal illustrated in FIG. 7.

Hereinafter, three phase terminals 120 are referred to as a first phase terminal 120A, a second phase terminal 120B, and a third phase terminal 120C. Referring to FIGS. 4 and 6 to 8, each of the three phase terminals 120 includes a second body 121 and a plurality of second connectors 122. The second body 121 has an arc shape. The second connectors 122 extend from the second body 121. The second connectors 122 include lateral portions 122a, vertical portions 122b, and terminals 122c. The lateral portions 122a are bent inward from both ends of the second body 121. The vertical portion 122b is perpendicularly bent upward from the lateral portion 122a. The terminal 122c is bent from the vertical portion 122b. The terminal 122c is a portion connected to the coil 31.

In addition, the second connector 122 includes a first branch portion 122d, a second branch portion 122e, and a terminal 122f. The first branch portion 122d is branched off upward from the lateral portion 122a. The second branch portion 122e is branched off upward from the first branch portion 122d. The terminal 122f is bent upward from the second branch portion 122e. The terminal 122f is connected to an external power source.

The second body 121 may include three second connectors 122. Two second connectors 122 among the three second connectors 122 may be connected to both end portions of the second body 121, and the remaining one second connector 122 may be disposed between the two second connectors 122 disposed on both end portions of the second body 121. In this case, the second connectors 122 disposed on both end portions of the second body 121 may include the lateral portions 122a, the vertical portions 122b, and the terminals 122c to be connected to the coils 31. In addition, the second connector 122 disposed between two second connectors 122 includes the first branch portion 122d, the second branch portion 122e, and the terminal 122f.

In the phase terminal 120 of the second body 121, a second width t2 in the axial direction is greater than a first width w2 in the radial direction on the basis of a cross-section taken along line B-B of FIG. 7. The terminal 100 includes the phase terminal 120 having a shape formed to stand vertically. The shape of the phase terminal 120 is to reduce scraps.

Referring to FIG. 6, a development pattern 2 is drawn on a raw material 1 which is a sheet metal member. A first member 2a having a long belt shape in the development pattern 2 corresponds to the second body 121. The first member 2a is bent to become the second body 121 having the arc shape. Second members 2b are disposed to have shapes branched off from both ends of the first member 2a. The second members 2b are bent to become the terminals 122c. In addition, a third member 2c is disposed to have a shape which branches off from the first member 2a. The third member 2c corresponds to the first branch portion 122d, a fourth member 2d corresponds to the second branch portion 122e, and a fifth member 2e is bent to become the terminal 122f.

When the belt shape of the first member 2a and a rectangular shape of the raw material 1 are considered, the development pattern 2 has a structure allowing fewer scraps to be generated. When it is considered that the number of the phase terminals 120 included in the motor is three, the phase terminal 120 having such a structure has an advantage in that the scraps are significantly reduced so that a manufacturing cost is reduced.

In the above description, although the neutral terminal 110 is illustrated as having the second width t1 that is less than the first width w1 in the radial direction and the phase terminal 120 is illustrated as having the second width t2 that is greater than the first width w2, the present invention is not limited thereto, and the neutral terminal 110 may be formed to have the second width t1 greater than the first width w1 and the phase terminal 120 may be formed to have the second width t2 less than the first width w2.

Meanwhile, the first width w1 of the neutral terminal 110 may be equal to the second width t2 of the phase terminal 120. The second width t1 of the neutral terminal 110 may be equal to the first width w2 of the phase terminal 120. Alternatively, a width t3 of the first connector 112 of the neutral terminal 110 in the axial direction may be equal to a width w3 of the second connector 122 of the phase terminal 120 in the radial direction.

Referring to FIG. 8, in the case of the first phase terminal 120A, the terminal 122c disposed at one side of the second connector 122 and the terminal 122c disposed at the other side of the second connector 122 may be asymmetrically disposed with respect to a virtual line L passing through a center P1 of the second body 121 and a center C of a first orbit O1.

FIG. 9 is a perspective view illustrating the second phase terminal, and FIG. 10 is a plan view illustrating the second phase terminal illustrated in FIG. 9.

Referring to FIGS. 9 and 10, like the first phase terminal 120A, the second phase terminal 120B also includes the lateral portion 122a, the vertical portion 122b, the terminal 122c, the first branch portion 122d, the second branch portion 122e, and the terminal 122f. Since the description of the second phase terminal 120B is the same as that of the first phase terminal 120A, the description will be omitted. However, in the case of the second phase terminal 120B, a length of the second body 121, a shape and a size of the lateral portion 122a, and the like are different from those of the first phase terminal 120A.

In addition, in the case of the second phase terminal 120B, the terminal 122c disposed at one side of the second connector 122 and the terminal 122c disposed at the other side may be symmetrically disposed with respect to a reference line passing through a center P2 of a width of the second body 121 and a center C of curvature of the second body 121.

FIG. 11 is a perspective view illustrating the third phase terminal, and FIG. 12 is a plan view illustrating the third phase terminal illustrated in FIG. 11.

Referring to FIGS. 11 and 12, like the first phase terminal 120A, the third phase terminal 120C also includes the lateral portion 122a, the vertical portion 122b, the terminal 122c, the first branch portion 122d, the second branch portion 122e, and the like. Since the description of the third phase terminal 120C is the same as that of the first phase terminal 120A, the description will be omitted. However, in the case of the third phase terminal 120C, a length of the second body 121, a shape and a size of the lateral portion 122a, and the like are different from those of the first phase terminal 120A. In addition, in the third phase terminal 120C, a position of the first branch portion 122d, a position of the second branch portion 122e, and a position of the terminal 122f are different from those of the first phase terminal 120A. In the case of the third phase terminal 120C, the first branch portion 122d is branched off from an upper surface of the second body 121 unlike the first phase terminal 120A and the second phase terminal 120B in which the first branch portion 122d is branched off from the second connector 122.

In addition, in the case of the third phase terminal 120C, the terminal 122c disposed at one side of the second connector 122 and the terminal 122c disposed at the other side of the second connector 122 may be symmetrically disposed with respect to a reference line passing through a center P3 of a width of the second body 121 and a center C of curvature of the second body 121.

Referring to FIGS. 2 and 4, the neutral terminal 110 is substantially disposed at one side of the body 41, and the phase terminals 120 are substantially disposed at the other side of the body 41. The plurality of terminals 122c are disposed at the same positions around a center of the bus bar in the radial direction. The first orbit O1 and a second orbit O2 will be described with reference to arrangement of the terminals 100. The first orbit O1 and the second orbit O2 have the same center as a center C of the bus bar 40. The first orbit O1 is disposed inward from the second orbit O2.

The first body 111 of the neutral terminal 110 is disposed on the second orbit O2. In addition, the second body 121 of the second phase terminal 120B is also disposed on the second orbit O2. In addition, the second body 121 of the first phase terminal 120A and the second body 121 of the third phase terminal 120C are disposed on the first orbit O1. The terminal 122c of the neutral terminal 110 is disposed between the first orbit O1 and the second orbit O2. The terminal 122c of the phase terminal 120 is also disposed between the first orbit O1 and the second orbit O2.

A length R1 from the center C of the bus bar 40 to the first body 111 of the neutral terminal 110 in the radial direction may be greater than lengths R2 and R3 from the center to the second bodies 121 of the phase terminals 120.

In addition, the terminal 122c of any one of the phase terminals 120 may be disposed between two terminals 122c of the other phase terminals 120. For example, any one of two terminals 122c of the first phase terminal 120A such as a terminal H2 of FIG. 4 may be disposed between the terminals 122c of the third phase terminal 120C such as terminals H1 of FIG. 4. Such a structure and an arrangement shape of the phase terminal 120 are for all of the terminals 122c to be disposed between the first orbit O1 and the second orbit O2 in the circumferential direction in a state in which the shapes of the neutral terminal 110 and the phase terminals 120 are different.

As described above, the motor according to the exemplary embodiment of the present invention has been specifically described with reference to the accompanying drawings.

The above-described embodiments should be considered in a descriptive sense only and not for purposes of limitation, and the scope of the present invention is defined not by the detailed description but by the appended claims. In addition, it should be interpreted that the scope of the present invention encompasses all modifications and alterations derived from meanings and the scope and equivalents of the appended claims.

The invention claimed is:

1. A motor comprising:
a housing;
a stator disposed in the housing;
a rotor disposed in the stator;
a shaft coupled to the rotor; and
a bus bar disposed on the stator and including a plurality of terminals,
wherein the plurality of terminals include a neutral terminal and a plurality of phase terminals,
the neutral terminal includes a first body of which a first width in a radial direction is greater than a second width in an axial direction and a plurality of first connectors extending from the first body, and
the phase terminal includes a second body of which a first width in the radial direction is less than a second width in the axial direction and a plurality of second connectors extending from the second body,
wherein the first body is disposed on the first orbit around a center of the bus bar,
wherein the second body is disposed on the second orbit around a center of the bus bar,
wherein each of the first connector and the second connector includes a terminal that contacts a coil of the stator, and
wherein the plurality of terminals are radially arranged between the first orbit and the second orbit and arranged in a circumferential direction.

2. The motor of claim 1, wherein:
a first width of the neutral terminal is equal to a second width of the phase terminal; and
a second width of the neutral terminal is equal to a first width of the phase terminal.

3. The motor of claim 1, wherein a width of the first connector of the neutral terminal in the axial direction is equal to a width of the second connector of the phase terminal in the radial direction.

4. The motor of claim 1, wherein:
the plurality of phase terminals include a first phase terminal, a second phase terminal, and a third phase terminal;
a second body of the first phase terminal and a second body of the third phase terminal are disposed on the first orbit; and
a second body of the second phase terminal is disposed on the second orbit.

5. The motor of claim 4, wherein the first orbit is disposed inward from the second orbit around the center of the bus bar.

6. The motor of claim 1, wherein the bus bar includes a body including a plurality of through holes, and positions of the through holes correspond to a position of the terminal.

7. The motor of claim 4, wherein:
the second connector includes a lateral portion extending from one side of the second body, a vertical portion extending upward from one portion of the lateral portion, and
the terminal protrude from one portion of the vertical portion.

8. The motor of claim 7, wherein the terminal of any one phase terminal among the first phase terminal, the second phase terminal, and the third phase terminal is disposed between two terminals of another phase terminal in a circumferential direction.

9. The motor of claim 7, wherein two terminals of the first phase terminal are asymmetrically disposed with respect to a virtual line connecting a center of the first orbit and a center of the second body of the first phase terminal.

10. The motor of claim 9, wherein two terminals of the second phase terminal are symmetrically disposed with reference to a virtual line connecting the center of the first orbit and a center of the second body of the second phase terminal.

11. The motor of claim 3, wherein a length from a center of the bus bar to the first body of the neutral terminal in the radial direction is greater than a length from the center of the bus bar to the second body of the phase terminal in the radial direction.

* * * * *